United States Patent [19]

Huret, deceased et al.

[11] Patent Number: 4,459,848

[45] Date of Patent: Jul. 17, 1984

[54] DEVICE FOR MAINTAINING A DIAL ON A HOUSING AND A DISTANCE RECORDER OR THE LIKE PROVIDED WITH SAID DEVICE

[75] Inventors: Roger Huret, deceased, late of Nanterre, France; by Alain P. B. Huret, legal representative, Bougival, France

[73] Assignee: Huret et ses Fils, Nanterre, France

[21] Appl. No.: 347,990

[22] Filed: Feb. 11, 1982

[30] Foreign Application Priority Data

Feb. 23, 1981 [FR] France .................................. 81 03507

[51] Int. Cl.³ .......................................... G01D 11/24
[52] U.S. Cl. ................................................... 73/431
[58] Field of Search ............... 248/27.1, 27.3; 73/431, 73/432 AD; 324/156; 116/62.1, 62.2, 284

[56] References Cited

U.S. PATENT DOCUMENTS

| | | | |
|---|---|---|---|
| 1,761,953 | 2/1928 | Zubaty | 73/431 |
| 2,285,658 | 1/1940 | Hitchcock | 73/431 |
| 3,712,138 | 1/1973 | Alinari | 73/431 |
| 3,972,239 | 8/1976 | Puster et al. | 73/431 |
| 4,207,768 | 6/1980 | Henss | 73/431 |

Primary Examiner—S. Clement Swisher
Assistant Examiner—Hezron Williams
Attorney, Agent, or Firm—Trexler, Bushnell & Wolters, Ltd.

[57] ABSTRACT

The device comprises an annular adaptor having a bottom provided with an opening so as to permit sliding the adaptor on the housing of the kilometer recorder and including a peripheral axial collar. The collar is provided with an assembling groove which receives a corresponding rib on a transparent window. An inner shoulder clamps the dial between these two elements. The window and the collar of the adaptor have shapes and sizes which may vary in accordance with the shapes and sizes of the dial.

11 Claims, 9 Drawing Figures

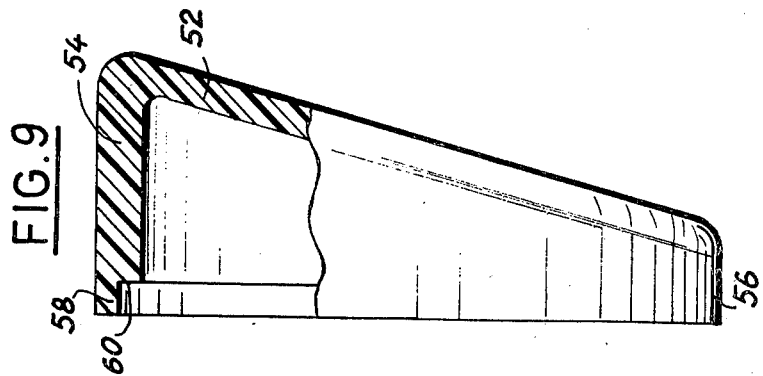
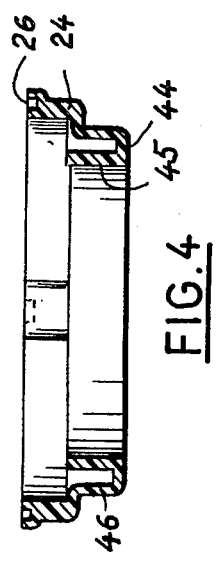
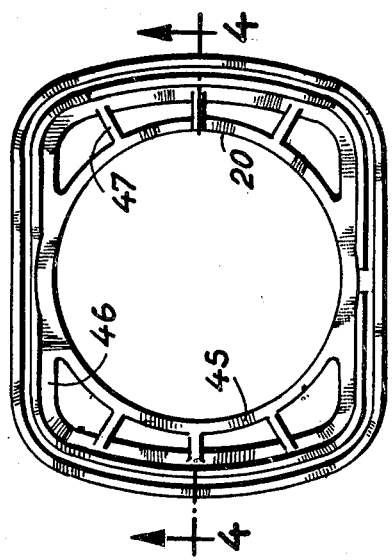
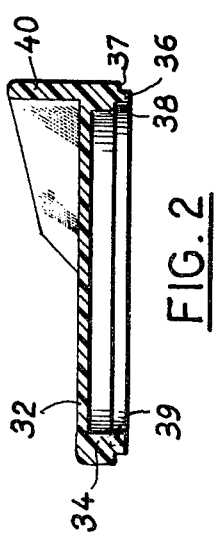
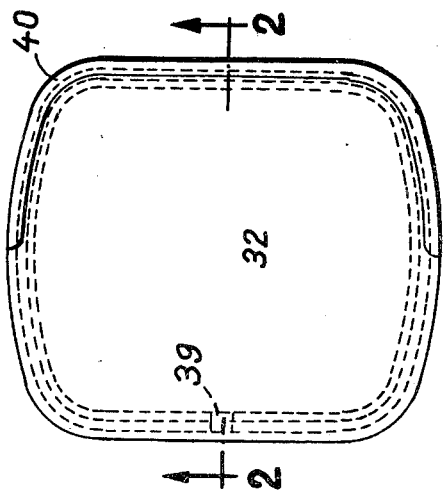

DEVICE FOR MAINTAINING A DIAL ON A HOUSING AND A DISTANCE RECORDER OR THE LIKE PROVIDED WITH SAID DEVICE

DESCRIPTION

One of the appreciated qualities of small distance or kilometer recorders or other recorders for two-wheeled vehicles or the like, is their small overall size. Efforts made in this respect have indeed made it possible to give a small volume to the recording or counting mechanism and consequently to the housing containing this mechanism. Unfortunately, the reading dial which usually covers one of the ends of the housing also has a small size and, in many cases, this renders the reading of the indications on the dial difficult.

Constructors have consequently been obliged to construct housings of different shapes and various dimensions for the purpose of adapting them to each application and in particular to the various types of vehicles and to attempt to conciliate in each case the avoidance of an excessive overall size with the requirement of an easy reading of the dial.

An object of the present invention is to considerably reduce and even eliminate this problem by permitting the mounting of dials of various dimensions and shapes on the same housing which is substantially standard and consequently the mounting of the dial which is always the most suitable, whatever its size, while manufacturing only one type of housing.

The invention therefore provides a device for maintaining a dial on a kilometer or like recorder which is bordered by a peripheral flange said device comprising an annular adaptor whose axial section is substantially in the shape of an L and which has a bottom provided with an aperture for the passage of the housing and a peripheral collar which axially projects from said bottom and is provided with means for assembly by a fitting together, a transparent window which has the same shape and dimensions in plan as the collar of the adaptor and comprises means for assembling by a fitting together cooperative with those of the adaptor, and an inner support shoulder for the dial to be maintained on the periphery of either said adaptor or collar, whereby the dial is locked therebetween when they are assembled.

The adaptor may be easily passed over a housing for a recorder or the like and applied against the flange of the housing by the assembly of the window, the dial being clamped therebetween. The shape of the dial now only depends on the shape of the collar of the adaptor and of the window and may consequently vary without any need to modify the housing.

Likewise, the dimension of the dial is in no way related to the dimension of the housing. The dial may moreover be replaced, if desired, since the device may be dismantled.

The assembling means are preferably formed by a peripheral groove formed in the edge of one of the elements and a corresponding rib formed on the edge portion of the other element, between two shoulders, one of which forms a support for the dial, the two shoulders being offset in height relative to the apex of the rib.

The window is preferably provided with a visor in the upper part thereof.

The ensuing description of embodiments given merely by way of examples and shown in the accompanying drawings will bring out the features and advantages of the invention.

In the drawings:

FIG. 2 is a sectional view taken on line 2—2 of FIG. 3 of a window;

FIG. 3 is a top plan view of the window of FIG. 2;

FIGS. 4 and 5 show the adaptor respectively in section taken along line 4—4 of FIG. 5 and in top plan view;

FIG. 9 is a side elevational view, with a part cut away, of a modification of the window.

Figure 1:
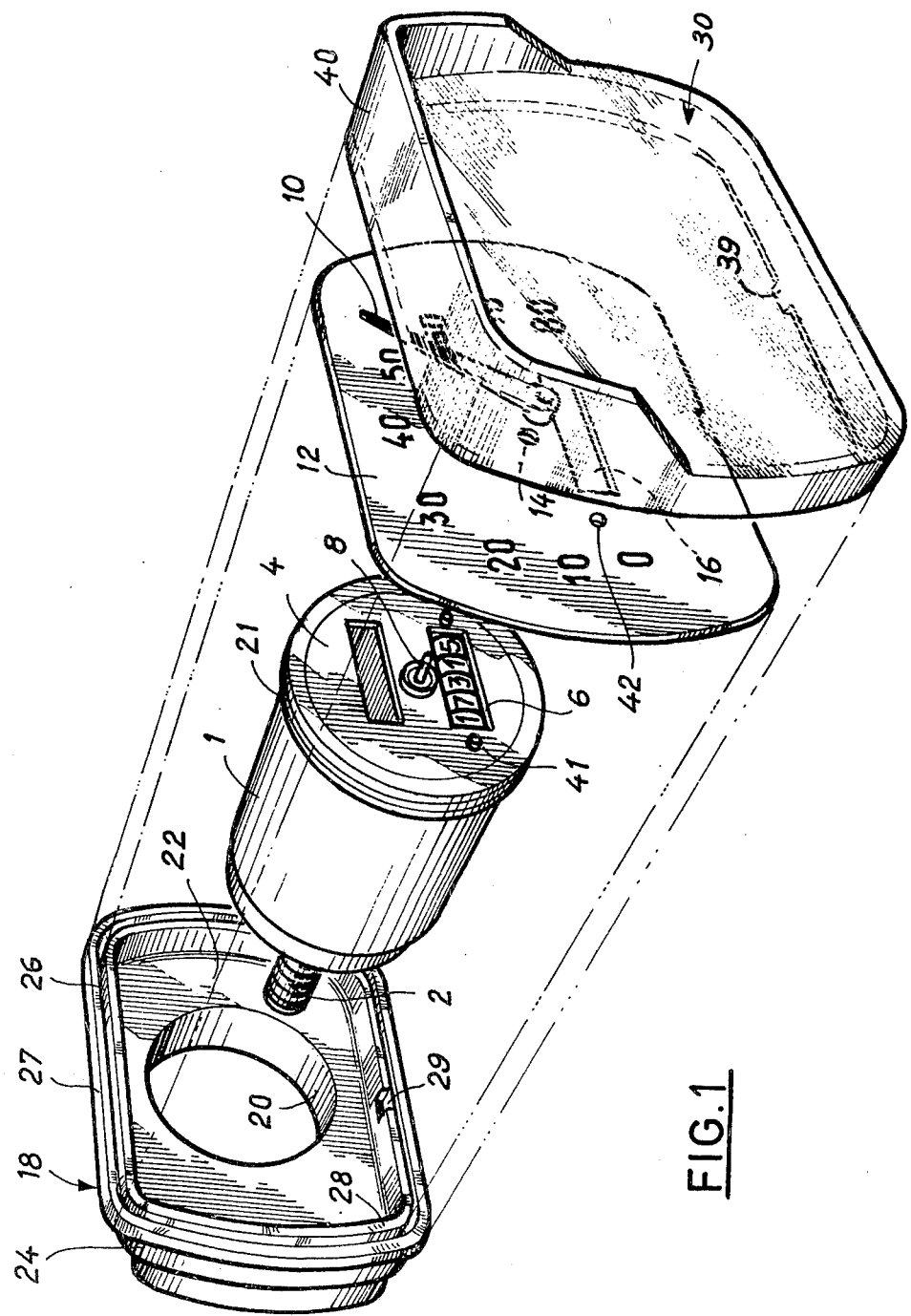
FIG. 1 is an exploded perspective view of a recorder or counter and the device for maintaining the dial.

FIG. 1 shows a distance or kilometer recorder or counter associated with a device for maintaining a dial according to the invention. The recorder is placed in a conventional housing 1, of cylindrical shape, which is provided at one end with a connector 2 for its connection to a driving device, and at its other end, with a closing plate 4. The plate 4 is provided with an opening 6 revealing the numbers of the kilometer recorder and a spindle 8 for driving a speed indicator needle 10 extends through the plate 4.

The needle 10 is adapted to move across a dial 12 which carries the indication of the speeds, and is provided with an opening 16 corresponding to the opening 6 of the housing and a central orifice 14 for the passage of the spindle 8.

The dial 12 shown in FIG. 1 has a substantially rectangular shape and a size which is distinctly greater than the size of the circular plate 4 closing the housing 1. This dial is mounted on the housing by means of an adaptor 18 which is provided with a central opening 20 whose diameter is very slightly larger than the diameter of the housing 1 so that the adaptor 18 can freely slide along the housing. The diameter of the opening 20 is however less than the diameter of a flange 21 carried by the housing 1 in the vicinity of the plate 4.

The adaptor has, when viewed in axial section, a substantially L-sectioned shape, one of the branches of the L being formed by the bottom 22 of the adaptor, which bottom is provided with the opening 20, whereas the other branch is formed by a collar 24 which axially projects from the bottom 22 and has on its free end means for assembling by a fitting together. In the presently-described embodiment, the assembling means comprise an end U-section portion which defines a groove 26 between two edge portions 27 and 28 respectively. The inner edge portion 28 has exactly the same size and shape as the edge of the dial 12 so that the latter can be exactly applied thereagainst while leaving the groove 26 free.

The device for maintaining the dial comprises also a window 30 made from a transparent material and including a planar plate 32 provided with a flange 34 from which extends a rib 36 which permits the assembly of the window with the adaptor 18 by the fitting of this rib 36 in the groove 26 (FIG. 2).

Formed on each side of the rib 36 are two shoulders 37 and 38 which are offset in height relative to the free end of the rib 36, the inner shoulder 38 being closer to the plate 32 than the outer shoulder 37. The difference in depth of the two shoulders substantially corresponds to the thickness of the dial 12 to be maintained and the shape of the shoulder 38 corresponds to the contour of this dial so that when the latter is applied against the edge portion 28, it is disposed in the shoulder 38 when the window 30 is clamped against the adaptor 18 so that these two elements fit together.

In order to facilitate this assembly, the edge portion 28 comprises preferably a recess 29 and the edge portion 34 of the window 30 forms a projecting portion 39 which is fitted in the recess 29 and also in a similar recess provided on the edge of the dial 12.

The window 30 is completed in its upper part by a visor 40 which projects outwardly and extends along a part of the two curved lateral sides of the window so as to protect the planar surface 32 of the window and facilitate a reading of the dial.

It is clear that the dial may be easily placed in position on the recorder or dismantled for replacement. When assembling, the adaptor 18 is mounted on the housing 1 and slide along the latter until its bottom 22 abuts against a side of the flange 21 of the housing remote from the dial. The height of the collar 24 exceeds the height of the flange 21 so that the assembling elements project beyond the housing. The dial 12 is then placed on the edge portion 28, this dial being centered relative to this edge portion by means of the spindle 8 which extends through the central orifice 14, and optionally by means of pins 41 carried by the plate 4 and extending through orifices 42 in the dial. The window 30 is then fitted on the adaptor 18 and blocks the dial 12 and the flange 21 between the window and the adaptor.

In this position, the dial maintaining device is held stationary relative to the housing 1 with which it is rendered completely integral. The indications on the dial may be easily read through the window 30.

It will be understood that the device may be dismantled at any time by separating the window and the adaptor so that it can be replaced by another device or merely possible subjected to a maintenance operation.

The adaptor shown in FIG. 1 comprises a bottom 22 which is solid, but it will be understood that the bottom 22 may, if required, be hollowed out. For example, it may be constructed as shown in FIGS. 4 and 5 by a U-section element 44 whose inner branch 45 surrounds the opening 20 for the passage of the housing 1 while the outer branch 46 carries the collar 24 provided with the groove 26 for fitting the window in the adaptor. The two branches 45 and 46 of the U are preferably interconnected by a number of radial arms 47 which impart sufficient strength to the adaptor.

When the dial must have a substantially rectangular shape, as shown in FIGS. 1 and 5, the ring formed by the inner branch 45 of the U-section element 44 which defines the opening 20 may, for example, be substantially tangent to the collar 24 as shown in FIG. 5 so that only the two lateral parts are hollowed out.

Figure 6:
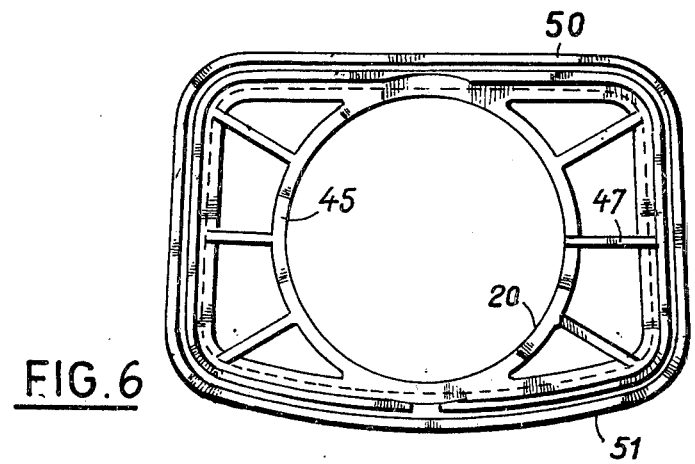
FIGS. 6, 7 and 8 are top plan views of three modifications of the adaptor.

The same arrangement may be adopted when the dial, the collar and the window have a trapezoidal shape such as the shape of the adaptor shown in FIG. 6. Such an adaptor comprises, on each side of the ring 45, or the opening 20, a rectilinear upper edge portion 50 and a curved lower edge portion 51 which are interconnected by smaller sides, and a bottom which may be solid or hollowed out in the manner shown in FIG. 5.

Figure 7:
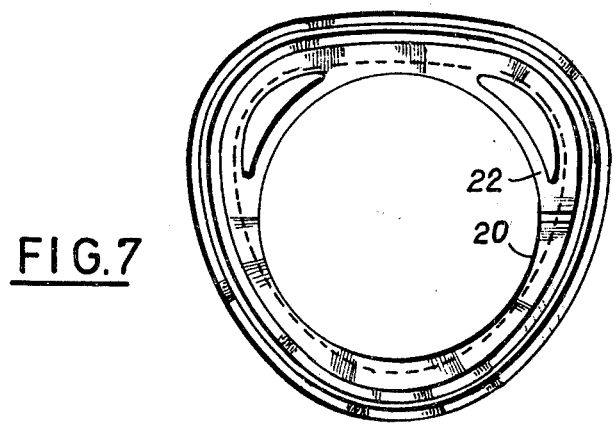
Figure 8:
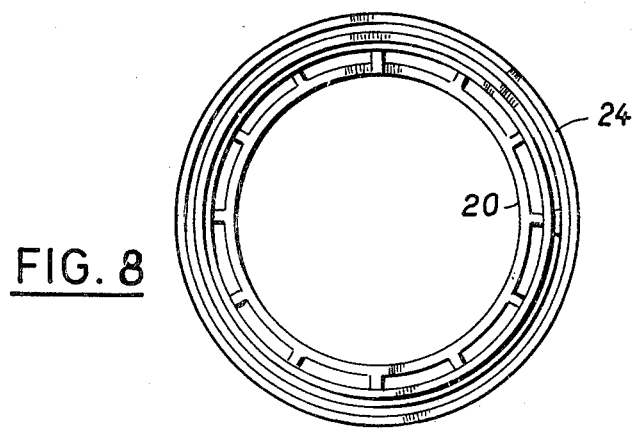

The adaptor may also have a circular or even triangular shape as shown in FIGS. 8 and 7 respectively. It may also have any other shape, depending on the desired size of the dial and the available space at the point of use.

It will be understood that the window has a corresponding shape and preferably includes a visor similar to the visor 40 of FIGS. 2 and 3.

According to a modification, the window may however comprise, as shown in FIG. 9, an inclined plate 52 provided with a ledge 54 which is wide in its upper part and narrow at 56 in its lower part, this ledge including means for assembling the window with the adaptor. In this case, the wide upper ledge 54 performs the function of a visor, and the plate 52 permits reading the dial.

The assembling means may be those which have been described, ie. may be formed by a rib disposed between two shoulders or be formed as shown in FIG. 9, by a peripheral rib 58 which surrounds an inner shoulder 60. In this case, the adaptor is provided with a rib for fitting against the shoulder 60, between two shoulders, and having consequently a shape similar to the shape of the flange 34 of the window shown in FIG. 2.

This adaptor is fitting on the window, while maintaining the dial therebetween, in the same way as the adaptors and windows of the previously-described embodiments, so that, in this case also, the dial is maintained with reliability against the housing but can be removed from the housing whenever necessary.

The window shown in FIG. 9 may have any desired shape, such as a rectangular, trapezoidal, circular, triangular, or other shape and thus adapted to various utilizations.

The device of the invention consequently permits the assembly with the housings of recorders or counters of standard types, all of which have a similar shape and an overall size which is as small as possible, of dials of various shapes which may be large enough to permit an easy reading of the dial and at the same time have a shape which corresponds to the available place.

Having now described my invention what I claim as new and desire to secure by Letters Patent is:

1. A kilometer or like recorder comprising in combination and assembled along a longitudinal axis of the recorder, a housing having an outer peripheral flange adjacent on end of the housing, a dial located adjacent said end of said housing, a device for maintaining the dial assembled with the housing and comprising an annular adaptor which has a substantially L-shaped axial section, a bottom which defines an opening by means of which opening the adaptor is co-axially mounted on said housing by sliding along said housing in a direction toward said end so that said bottom is in abutting relation to said flange on a side of said flange remote from said dial, said adaptor being free to slide along said housing in a direction away from said end without damage to a component part of the recorder for disassembly from said housing for interchanging the adaptor for a different adaptor, said adaptor having a peripheral collar which axially projects from said bottom, surrounds said flange and includes means for assembly, a transparent window having the same shape and size as the collar of the adaptor when viewed in a direction parallel to said axis and comprising means for assembly detachably cooperative with said means for assembly of said adaptor, and an inner support shoulder for the dial on a periphery of one of two elements consisting of said window and said adaptor, whereby the dial is trapped and held between said elements when the said elements are assembled solely by their means for assembly and is maintained against the housing when said elements are assembled with said flange interposed therebetween.

2. A recorder according to claim 1, wherein said assembly means comprise a peripheral groove on one of said elements and a rib on the other of said elements located between two shoulders which are axially offset from each other, one of said shoulders forming said inner support shoulder for the dial.

3. A recorder according to claim 1 or 2, wherein the window comprises a planar side and, on one side of said side, a visor which projects axially outwardly and on an opposite side of said side an axially extending ledge carrying said assembling means of said window.

4. A recorder according to claim 1 or 2, wherein the window comprises a transparent planar side and a ledge whose depth varies and is of greater depth in the upper part of the window than in the lower part of the window, said assembly means of the window being carried by a free end portion of said ledge.

5. A recorder according to claim 1 or 2, wherein the adaptor comprises a solid bottom which defines the opening for the housing and carries the peripheral collar.

6. A recorder according to claim 1 or 2, wherein the adaptor comprises around said opening a hollowed out wall.

7. A recorder according to claim 1 or 2, wherein the shape of the collar, of the adaptor, of the ledge of the window and of the dial when viewed in a direction parallel to said axis is triangular.

8. A recorder according to claim 1 or 2, wherein the shape of the collar, of the adaptor, of the ledge of the window and of the dial when viewed in a direction parallel to said axis is triangular.

9. A recorder according to claim 1 or 2, wherein the shape of the collar, of the adaptor, of the ledge of the window and of the dial when viewed in a direction parallel to said axis is round.

10. A recorder according to claim 1 or 2, wherein the shape of the collar, of the adaptor, of the ledge of the window and of the dial when viewed in a direction parallel to said axis is trapezoidal.

11. A set of component parts for constructing a kilometer or like recorder, said set comprising a single housing having a longitudinally extending axis and a peripheral flange adjacent an end of the housing, a plurality of dials, a plurality of different devices for coaxially mounting on the housing for respectively maintaining the dials assembled coaxially with the housing adjacent said end of the housing, each device comprising an annular adaptor which adaptor has a substantially L-shaped axial section, a bottom which defines an opening through which opening said housing is axially movable for assembly until said bottom is in abutting relation to a side of said flange remote from a respective one of said dials, each adaptor having a peripheral collar which axially projects from said bottom and includes first means for assembly, a plurality of transparent windows having second means for assembly which are detachably cooperative with said first means for assembly, and an inner support shoulder for a respective one of said dials on a periphery of one of two elements consisting of one of said windows and a corresponding one of said adaptors whereby the respective dial is trapped and held between the corresponding elements when said corresponding elements are assembled solely by said first and second assembly means and is maintained against the housing when said flange is interposed therebetween, each window having a different shape when viewed in a direction parallel to said axis but substantially the same shape as the corresponding adaptor and dial so that the suitable window and the corresponding adaptor and dial can be chosen to suit the desired application and assembled with said housing which housing is capable of being used with any corresponding one of said dials, adaptors and windows.

* * * * *